US011409734B2

(12) United States Patent
Yim et al.

(10) Patent No.: US 11,409,734 B2
(45) Date of Patent: Aug. 9, 2022

(54) BLOCKCHAIN SYSTEM AND OPERATION METHOD THEREOF

(71) Applicant: ELECTRONICS AND TELECOMMUNICATIONS RESEARCH INSTITUTE, Daejeon (KR)

(72) Inventors: Jong Choul Yim, Daejeon (KR); Sun Me Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 283 days.

(21) Appl. No.: 16/667,520

(22) Filed: Oct. 29, 2019

(65) Prior Publication Data
US 2020/0133943 A1  Apr. 30, 2020

(30) Foreign Application Priority Data

Oct. 29, 2018   (KR) .................. 10-2018-0130116
Oct. 23, 2019   (KR) .................. 10-2019-0132521

(51) Int. Cl.
*G06F 16/00*      (2019.01)
*G06F 16/23*      (2019.01)

(52) U.S. Cl.
CPC ...... *G06F 16/2379* (2019.01); *G06F 16/2365* (2019.01)

(58) Field of Classification Search
CPC ........... G06F 16/2379; G06F 16/2365; G06Q 2220/00; G06Q 20/065; G06Q 20/389; G06Q 20/405; G06Q 20/401; H04L 2209/38; H04L 9/3239
See application file for complete search history.

(56) References Cited

U.S. PATENT DOCUMENTS

| 10,097,344 B2 | 10/2018 | Davis |
| 2015/0134971 A1 | 5/2015 | Park et al. |
| 2017/0212781 A1 | 7/2017 | Dillenberger et al. |

(Continued)

FOREIGN PATENT DOCUMENTS

| KR | 101887894 B1 | 8/2018 |
| KR | 1020180108566 A | 10/2018 |
| WO | 2017066715 A1 | 4/2017 |

OTHER PUBLICATIONS

David Mazieres, "The Stellar Consensus Protocol: A Federated Model for Internet-level Consensus", Feb. 25, 2016, pp. 1-32.

(Continued)

*Primary Examiner* — Noosha Arjomandi
(74) *Attorney, Agent, or Firm* — Rabin & Berdo, P.C.

(57) ABSTRACT

Disclosed is a blockchain system. A blockchain system according to an embodiment of the present disclosure includes: at least one confirmation node; at least one management node configuring a confirmation group by including the at least one confirmation node, and configuring a confirmation block by combining transactions generated in the confirmation group; and an operator node controlling the at least one management node, wherein the at least one management node configures blockchain by combining respective confirmation blocks, wherein the management node configures the blockchain by resetting a parent block on the basis of an generation order of the confirmation blocks and distributes the blockchain.

19 Claims, 13 Drawing Sheets

(56) References Cited

U.S. PATENT DOCUMENTS

| | | | |
|---|---|---|---|
| 2018/0198794 A1 | 7/2018 | Huh et al. | |
| 2018/0341930 A1* | 11/2018 | Moir | G06Q 20/0655 |
| 2019/0034926 A1* | 1/2019 | Davis | H04L 9/3247 |
| 2019/0172026 A1* | 6/2019 | Vessenes | G06Q 20/3674 |
| 2019/0327084 A1* | 10/2019 | Oh | H04L 9/0643 |
| 2019/0379538 A1* | 12/2019 | Oh | G06F 16/9014 |
| 2020/0007558 A1* | 1/2020 | Inokuchi | H04L 9/3239 |
| 2020/0013027 A1* | 1/2020 | Zhu | G06Q 20/0658 |
| 2020/0050797 A1* | 2/2020 | Suh | G06F 21/64 |
| 2020/0051361 A1* | 2/2020 | Cui | G06Q 20/341 |
| 2020/0074468 A1* | 3/2020 | Arai | G06Q 20/389 |
| 2020/0133943 A1* | 4/2020 | Yim | G06F 16/2365 |
| 2020/0228317 A1* | 7/2020 | Ma | H04L 9/3218 |
| 2020/0311051 A1* | 10/2020 | Sato | G06F 16/9024 |
| 2020/0366495 A1* | 11/2020 | Mahoney | G06F 16/2379 |
| 2020/0394648 A1* | 12/2020 | Blackshear | G06Q 20/3823 |
| 2021/0014069 A1* | 1/2021 | Garg | H04L 9/0637 |
| 2021/0135854 A1* | 5/2021 | Karame | G06Q 20/3678 |
| 2021/0303543 A1* | 9/2021 | Akamatsu | H04M 3/5116 |
| 2021/0312558 A1* | 10/2021 | Floyd | H04L 9/3239 |

OTHER PUBLICATIONS

J.C. Yim er al., "Blockchain and Consensus Algorilim " DOI:10.22648/ETRI.2018.J.330105.
Loi Luu et al.,," A Secure Sharding Protocol for Open Blockchains ",CCS '16: Proceedings of the 2016 ACM SIGSAC Conference on Computer and Communications Security, Oct. 2016, pp. 17-30, https://doi.org/10.1145/2976749.2978389.

* cited by examiner

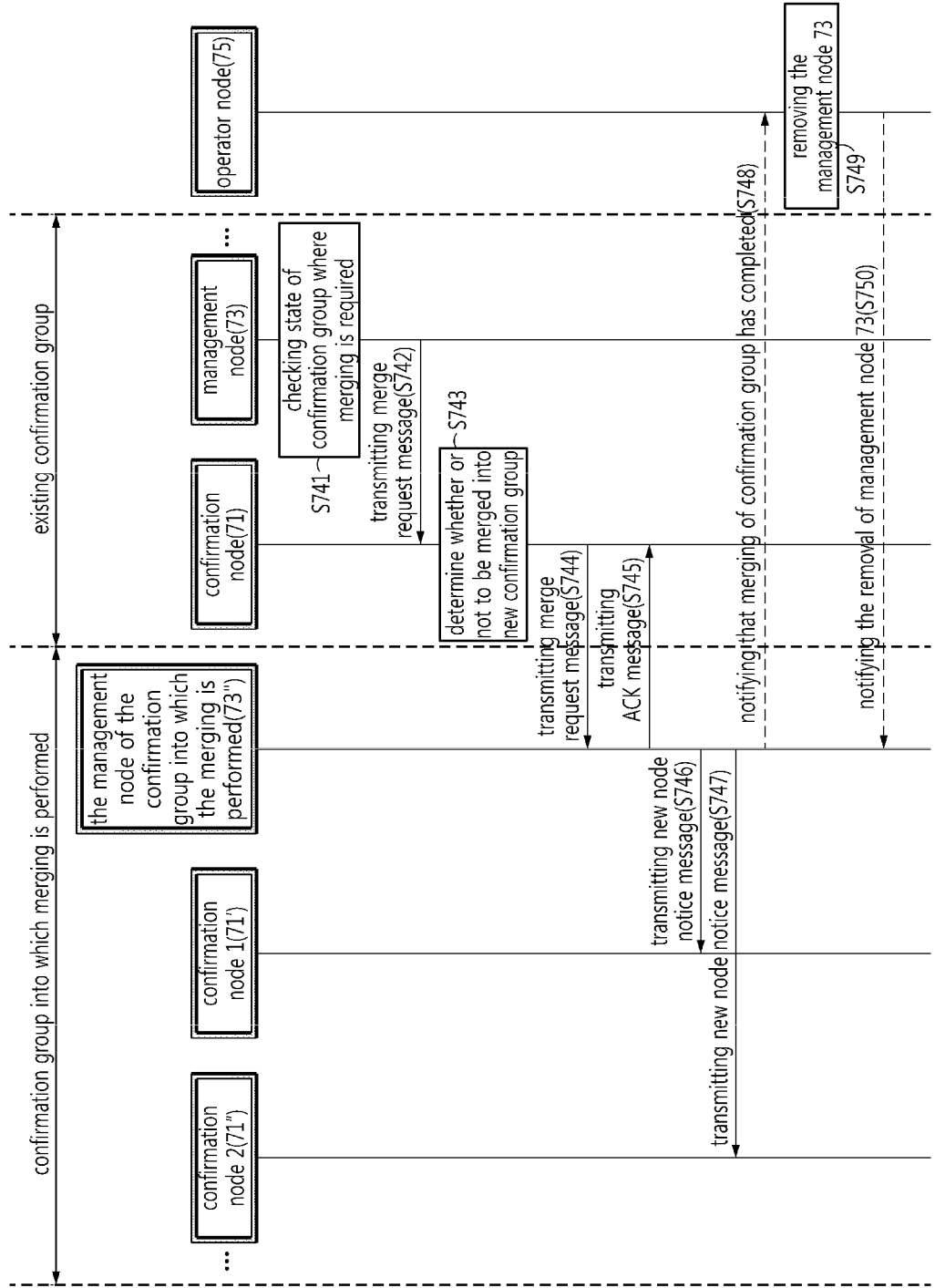

BLOCKCHAIN SYSTEM AND OPERATION METHOD THEREOF

CROSS REFERENCE TO RELATED APPLICATION

The present application claims priority to Korean Patent Application No. 10-2018-0130116 and 10-2019-0132521, filed Oct. 29, 2018 and Oct. 23, 2019, the entire contents of which is incorporated herein for all purposes by this reference.

BACKGROUND OF THE INVENTION

Field of the Invention

The present disclosure relates to a blockchain technique. More particularly, the present disclosure relates to a configuration of a blockchain system and an operating method thereof.

Description of the Related Art

A blockchain means a data management technique of recording continuously increasing data on the basis of a specific block, and managing the blocks by nodes constituting a P2P (peer-to-peer) network in a data structure of a chain form, or data itself configured in a data structure of a chain form. Herein, blockchain data configured in a data structure of a chain form can be operated in a distributed ledger form within each node without a central system.

A blockchain network or each blockchain node constituting a blockchain system is configured to control data configured in a block. In other words, in each block, a hash value of a previous block is recorded, and the previous block is referenced by the hash value. Accordingly, when blocks are stacked, forgery of transaction data recorded in the block becomes difficult, and thus transaction data recorded in each block is improved in reliability.

In the blockchain system, when a request for processing a transaction is received from a predetermined terminal, validity verification is performed on the transaction. When it is determined to be valid, transaction data is transmitted to a block generation node. Subsequently, the block generation node records the corresponding transaction data in a new block, and the new block is distributed in a blockchain network so that consensus of the same is achieved. By the above process, transmission of transaction data can be performed without a central management system, and a system configured without such a central management system is referred to as a permissionless blockchain system or public blockchain system.

A permissionless blockchain system provides a constant speed for processing a transaction regardless of an increase in a number of nodes participating in generation of a block, but a general transaction processing speed is remarkably low. In addition, the permissionless blockchain system is a system based on decentralization, and thus an entity for managing the system is not present, and thus when a problem occurs when operating the system, there is no entity responsible for the same.

SUMMARY OF THE INVENTION

In order to make up for weak points of a permissionless blockchain system, a permissioned blockchain system has been provided. The permissioned blockchain system can provide, in general, improved performance in terms of a transaction processing speed as a block is generated by performing consensus on the block between a relatively small number of nodes, but decentralization cannot be employed as the nodes generating blocks are restricted.

In accordance with the above, configuring a blockchain system managed by an operation entity is required, at the same time a system capable of solving "decentralization" problems is also required.

The technical solution of the present disclosure is to provide a blockchain system enabling an open membership operation where node participations are free and which has an entity responsible for operation of a blockchain, and an operating method thereof.

Another technical solution of the present disclosure is to provide a blockchain system configuring a blockchain on the basis of a confirmation group where node participations are open, and controlling an entity managing the confirmation group, and an operation method thereof.

Technical solutions obtainable from the present disclosure are not limited the above-mentioned technical solutions, and other unmentioned technical solutions can be clearly understood from the following description by those having ordinary skill in the technical field to which the present invention pertains.

According to one aspect of the present disclosure, there is provided a blockchain system. The system includes: at least one confirmation node; at least one management node configuring a confirmation group by including the at least one confirmation node, and configuring a confirmation block by combining transactions generated in the confirmation group; and an operator node controlling the at least one management node, wherein the at least one management node configures a blockchain by combining respective confirmation blocks, wherein the management node configures the blockchain by resetting a parent block on the basis of an generation order of the confirmation blocks and distributes the blockchain.

According to one aspect of the present disclosure, there is provided method of operating a blockchain system. The method includes: respectively configuring, by at least one management node controlled by an operator node, at least one confirmation group including the management node and at least one confirmation node; respectively configuring, by the least one management node, a confirmation block by combining transactions generated in the confirmation group; and configuring, by the least one management node, a blockchain by combining the confirmation blocks configured in another management node, wherein the blockchain is configured by resetting a parent block according to a generation order of the confirmation blocks so as to be distributed.

It is to be understood that the foregoing summarized features are exemplary aspects of the following detailed description of the present invention without limiting the scope of the present disclosure.

According to the present disclosure, there is provided a blockchain system employing an open membership operation where node participations are opened and which has an entity responsible for operation of a blockchain, and an operating method thereof.

According to the present disclosure, there is provided a blockchain system configuring blockchain on the basis of a confirmation group where node participations are open, and controlling an entity managing the confirmation group, and an operation method thereof.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 7D is a view of a flowchart showing operations of performing merging on a confirmation node of the blockchain system according to an embodiment of the present disclosure.

DETAILED DESCRIPTION OF THE INVENTION

Figure 1:
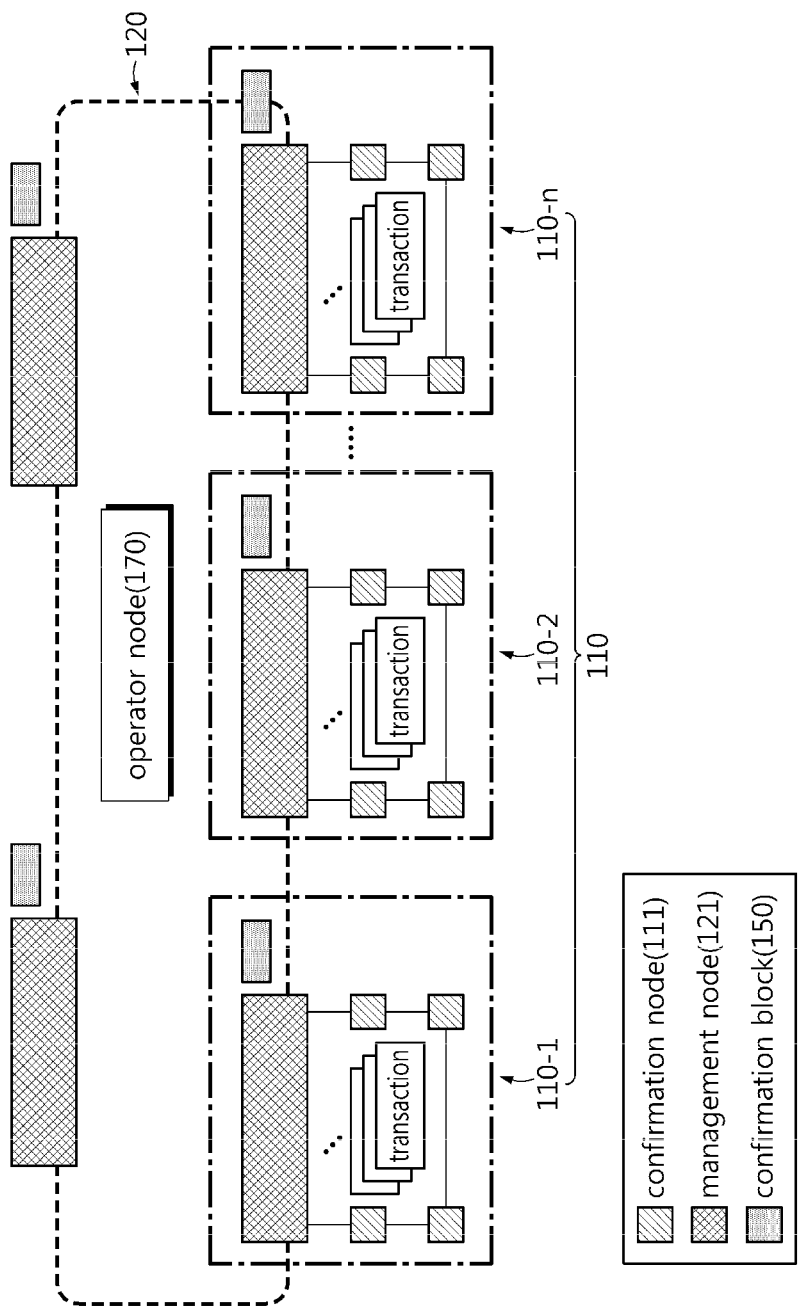
FIG. 1 is a view of a configuration showing a blockchain system according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanied drawings.

FIG. 1 is a view of a configuration showing a blockchain system according to an embodiment of the present disclosure.

Referring to FIG. 1, a blockchain system 100 according to an embodiment of the present disclosure may include a confirmation node 111 and a management node 121.

The management node 121 may configure a confirmation group 110 by combining at least one confirmation node 111. For the same, the management node 121 may manage participation, transfer, merging, etc. of the confirmation node 111 within the confirmation group 110.

Particularly, the management node 121 may generate a confirmation block 150 by combining transactions generated on the basis of the confirmation group 110. Herein, generating the confirmation block 150 has to be performed by using an appropriate algorithm between member nodes included in the confirmation group, that is, at least one confirmation node 111. For example, for a consensus algorithm, a PBFT (practical byzantine fault tolerant) protocol may be applied.

In addition, the management node 121 may configure another management node and blockchain network 120 in a parent layer of the confirmation group 110, and configure a blockchain by performing a final operation on the confirmation block 150 through a blockchain network 120. The block generated on the basis of the confirmation group 110 is referred to as a confirmation block, and in order to distinguish from the block configured by performing a final operation on the confirmation block, the block on which the final operation is performed through the blockchain network 120 is referred to as a final block.

In order to prevent an existing confirmation block from being changed in configuration and to ensure transparent processing, a final block may be configured by adding a scalable header to a confirmation block while not performing changing in configuration on the existing confirmation block. As described above, the final block is configured by adding the scalable header to the confirmation block, and thus the confirmation block generated on the basis of the confirmation group through the blockchain network can be prevented from being arbitrarily changed in configuration.

Further, the management node 121 may be a node authenticated by an operation entity operating the blockchain network 120. For the same, the blockchain system 100 may further include an operator node 170 managing participation, withdrawal, etc. of the management node 121.

As described above, the blockchain network 120 may be configured with a non-public blockchain system where the management node 121 constituting the network is generally restricted by the operation entity. However, the confirmation node 111 participating in the confirmation group 110 provided to a child layer of the blockchain network 120 is not restricted by the operation entity operating the blockchain network 120, and thus the confirmation group 110 may be configured with a public system.

As a result, the blockchain system 100 according to an embodiment of the present disclosure may provide a blockchain that is managed by the operation entity operating the blockchain network 120, and a system may be employed where decentralization is achieved in the confirmation group 110 generating each block.

Figure 2:
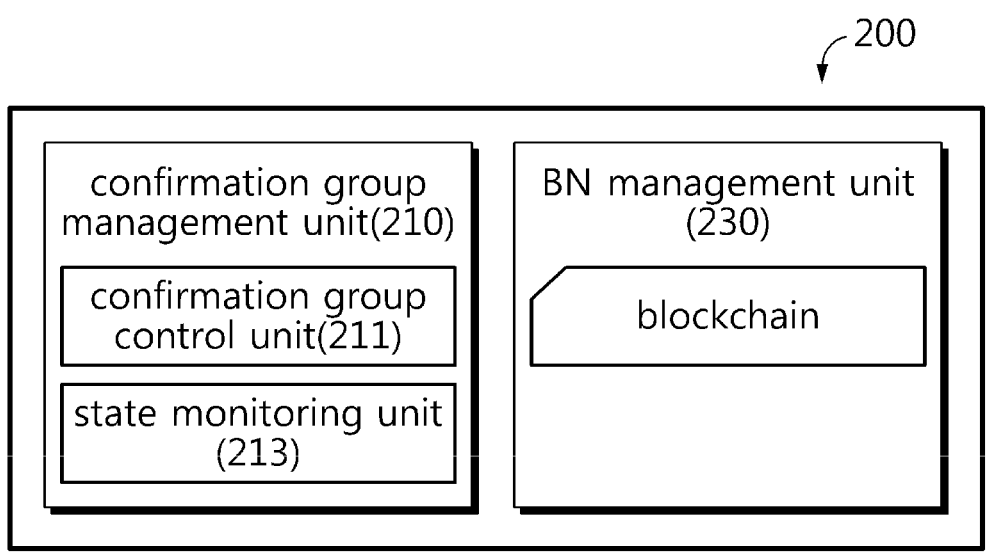
FIG. 2 is a block diagram of a configuration showing a management node included in the blockchain system according to an embodiment of the present disclosure.

FIG. 2 is a block diagram of a configuration showing a management node included in the blockchain system according to an embodiment of the present disclosure.

Referring to FIG. 2, a management node 200 may include a confirmation group management unit 210 managing a confirmation group, and a blockchain network management unit (hereinafter, referred to as "BN management unit") 230 managing a blockchain network.

First, the confirmation group management unit 210 may include a confirmation group control unit 211, and the confirmation group control unit 211 may check a participation request in a confirmation group which is generated in the node, and provide the result of whether or not to approve the participation in the confirmation group in association thereto to the corresponding node. The confirmation group is configured with a public system, and thus participation of the node is not restricted by the operation entity of the system, that is, the operator node. However, there is a possibility that a malicious node tries to participate in the confirmation group so as to interfere with normal operations of the blockchain system. For example, by configuring a single physical node with multiple logical nodes, and involving the multiple logical nodes in participating in the same confirmation group, the corresponding confirmation group may be interfered with when generating a confirmation block. In accordance with the above, the confirmation group control unit 211 may determine whether or not to approve the participation in the confirmation group.

Further, in order to ensure performance of the confirmation group, participation of a node having relatively low performance may be restricted. For the same, the confirmation group control unit 211 may check a processing time of proof of work of the node that has transmitted a participation request, and approve the participation of the node that has transmitted the participation request by using the checked time.

In addition, the confirmation group control unit 211 may perform operations of resetting a confirmation group, performing merging on a confirmation node included in any one confirmation group to another confirmation group, performing transfer to a new confirmation group, etc. according to improvement in performance, failure recovery, efficient load distribution, etc. of the blockchain system. For the same, the confirmation group management unit 210 may include a state monitoring unit 213 monitoring a state of the confirmation group. The state monitoring unit 213 may provide a state of the confirmation group to the confirmation group control unit 211, and the confirmation group control unit 211 may perform operations of resetting a confirmation group, performing merging on a confirmation node, performing transfer to a new confirmation group, etc. according to the state of the confirmation.

Detailed operations of the confirmation group control unit 211 that perform operations of approving participation in a confirmation group, resetting a confirmation group, performing merging on a confirmation node, performing transfer to a new confirmation group, etc. will be described with reference to FIGS. 7A to 7D below.

Meanwhile, the BN management unit 230 may perform operations of receiving a transaction from at least one confirmation node included in the confirmation group, generating a confirmation block by using a consensus algorithm between nodes belonging to the confirmation group, transmitting the generated confirmation block to another management node, and receiving a confirmation block generated by another management node. In addition, through a final operation on the confirmation block, the BN management unit 230 may perform operations of configuring a final block, storing the final block in a local storage, and transmitting the final block to a confirmation node included in the confirmation group. The final operation may be performed on the confirmation block by using a consensus protocol between management nodes provided to the blockchain network.

Figure 3:
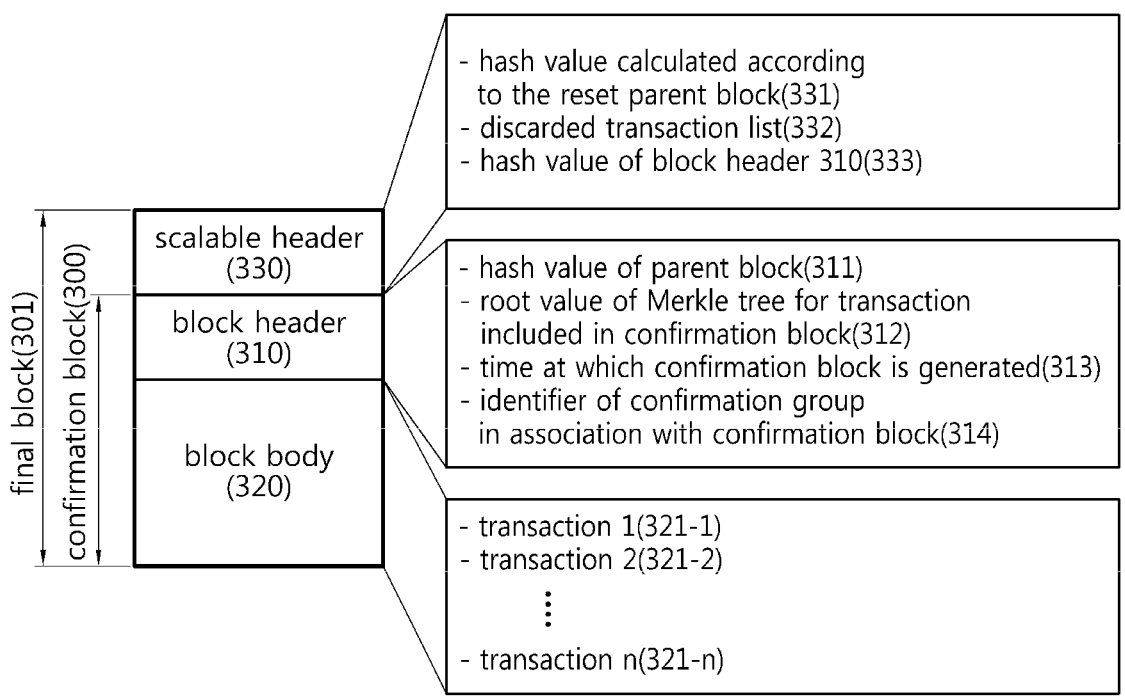
FIG. 3 is a view of an example showing a confirmation block generated by the blockchain system according to an embodiment of the present disclosure.

FIG. 3 is a view of an example showing a confirmation block and a final block which are generated in the blockchain system according to an embodiment of the present disclosure. Referring to FIG. 3, a confirmation block 300 may be generated by the above-described BN management unit 230. The confirmation block 300 may mean, conceptually, a group of multiple transactions, and include a block header 310 and a block body 320 including transactions (321-1, 321-2, . . . , 321-n) generated in the confirmation group. Consensus on the confirmation block 300 has to be performed by using an appropriate consensus algorithm within the confirmation group. For example, when generating a confirmation block 300, a PBFT protocol may be used.

The BN management unit 230 may determine a hash value 311 of a parent block, a root value 312 of a Merkle tree for a transaction included in the confirmation block, a time 313 at which the confirmation block is generated, and an identifier 314 of the confirmation group in association with the confirmation block, and insert the determined values 311, 312, 313, and 314 in to the block header 310.

Figure 4A:
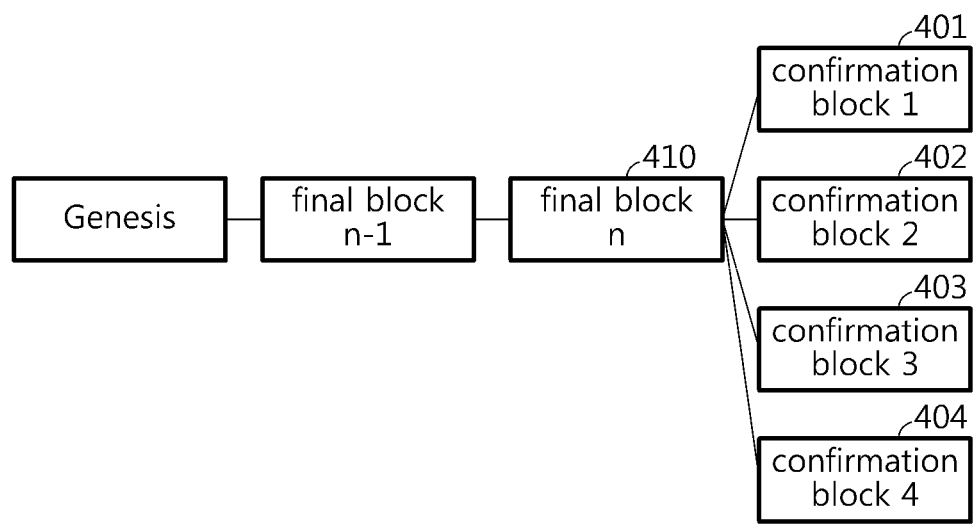
FIG. 4A is a view of an example showing connection relations between the confirmation blocks generated by the blockchain system according to an embodiment of the present disclosure.

Further, each of the at least one management node included in the blockchain system may be configured to generate a confirmation block by using a transaction generated in each confirmation group in a parallel manner. Accordingly, multiple confirmation blocks may be respectively configured to have the same final block as a parent block. For example, as shown in FIG. 4A, first to fourth confirmation blocks 401, 402, 403, an 404 respectively generated by first to fourth management nodes may set the last block 410 as a parent block.

According to a feature of a blockchain, blocks have to be sequentially connected and chained, and it has to be ensured that transactions included in each block are sequentially executed. However, as described above, when the first to fourth confirmation blocks 401, 402, 403, and 404 are configured in parallel, that is, when multiple child blocks are connected to one parent block, the feature of the blockchain is not accurately reflected therein. Accordingly, in order to solve the above problem, an adjustment operation is required. In the adjustment operation, first, an operation of converting into a configuration where one parent block is present by adjusting confirmation blocks having the same parent block is required, and second, an operation of resolving conflicts between transactions included in the individual confirmation block is required. It is not preferable to arbitrarily perform the above adjustment operation in a management layer in terms of decentralization. Such an adjustment operation has to be performed transparently and minimally.

Figure 4B:
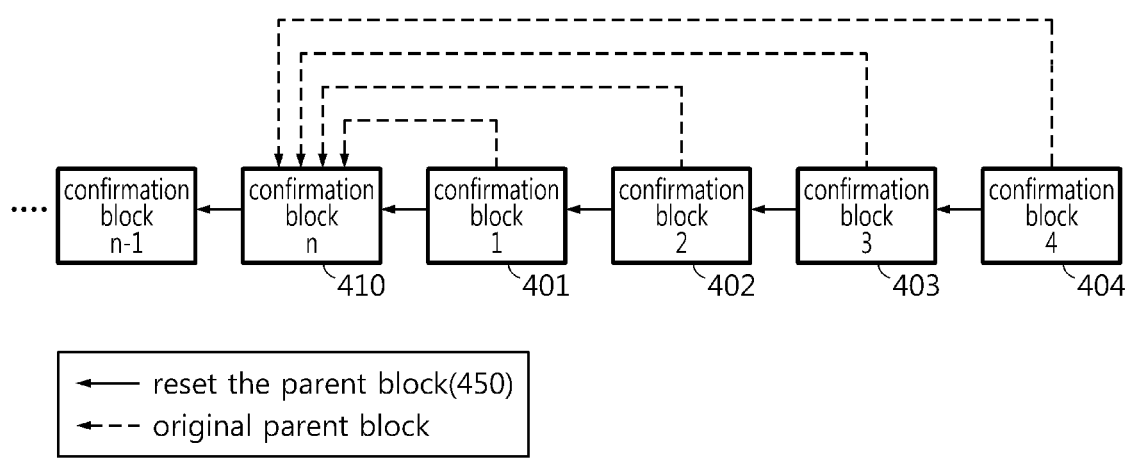
FIG. 4B is a view of an example showing connection relations that are reconfigured according to a generation order of the confirmation blocks shown in an example of FIG. 4A.

In accordance with the above, it is preferable for the BN management unit 230 to set an order of the first to fourth confirmation blocks 401, 402, 403, and 404 according to times 313 at which the confirmation blocks included in the block header 310 are generated. In addition, the BN management unit 230 may reset the parent block (450, refer to FIG. 4B) according to the order of the first to fourth confirmation blocks 401, 402, 403, and 404, and calculate a hash value according to the reset parent block.

Further, the BN management unit 230 may configure the confirmation block (300, refer to FIG. 3) to further include a scalable header 330, and insert a hash value 331 calculated according to the reset parent block into the scalable header 330. Meanwhile, as described above, each of a plurality of management nodes is configured to generate a confirmation block in parallel by using a transaction generated in each confirmation group, and thus the same transaction may be present within confirmation blocks different with each other, and a transaction causing double spending may be also present.

Herein, the above case refers that a conflict occurs between transactions. Based on the above, the BN management unit 230 may determine whether or not a conflict between transactions is present within confirmation blocks different with each other, if so, the BN management unit 230 may discard the corresponding transaction. In addition, the BN management unit 230 may generate a discarded transaction list 332 which includes discarded transactions and insert the list into the scalable header 330 such that the discarded transactions are not performed.

Adding information on an adjustment operation through the scalable header 330 is for preventing the confirmation block generated in the confirmation group from being arbitrarily modified by a management group layer. In other words, the above proves forces the management group layer not to arbitrarily modify the confirmation block.

The BN management unit 230 may check and verify a transaction generated on the basis of a predetermined time within the confirmation group, and configure a confirmation block by combining the verified transactions and store the confirmation block. Herein, the BN management unit 230 may configure a confirmation block 300 including a block header 310 and a block body 320 shown in an example of FIG. 3. Consensus on the confirmation block 300 has to be performed between confirmation group nodes through an appropriate consensus protocol.

The BN management unit 230 may perform different operations according to whether the corresponding management node is the leader or follower. When generating a blockchain network configured with management nodes, one of the management nodes may be selected as the leader node, and management nodes other than the leader node may be determined as a follower node. When the leader node cannot function as the leader for operations of unexpected errors or server exchange, one of the follower nodes may be selected as the leader node. Selecting the leader node may be performed according to a predetermined order (for example, round-robin method), or on the basis of a random timer. The BN management unit 230 of the management node operating as the leader node performs functions of the above-described leading adjustment operation on the confirmation block.

Figure 5A:
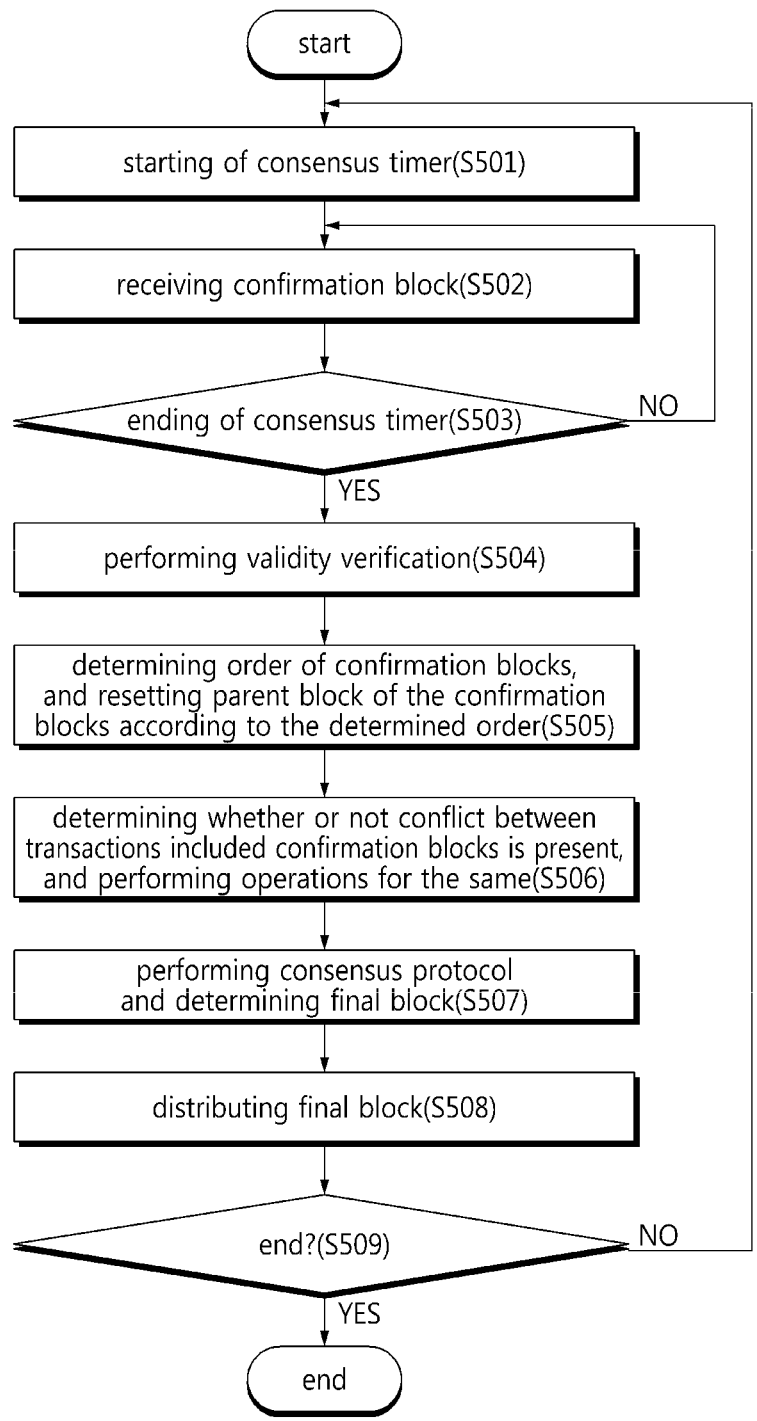
FIG. 5A and FIG. 5B are, respectively, a view of a flowchart showing detailed operations of a BN management unit of FIG. 2.

Hereinafter, referring to FIGS. 5A and 5B, detailed operations of the BN management unit 230 shown in FIG. 3 will be described. FIG. 5A is a view of a flowchart showing detailed operations of the BN management unit shown in FIG. 3, and shows an operational order of the management node operating as the leader node.

In S501, when a consensus timer starts, in S502, the BN management unit may receive a confirmation block from another management node. Receiving the confirmation block is performed until the consensus timer ends in S503.

Subsequently, when the consensus timer ends (S503—YES), in S504, the BN management unit performs validity verification on the received confirmation block. Subsequently, an adjustment operation on the confirmation block is performed on the block on which validity verification is completed.

In S505, the BN management unit may determine an order of the received confirmation blocks according to times 313 at which the confirmation blocks included in the block header 310 are generated, and reset a parent block of the confirmation blocks according to the determined order. In addition, the BN management unit may configure an initialized scalable header 330 in the confirmation block, calculate a hash value according to the reset parent block, and insert the calculated hash value 331 into the scalable header 330.

In S506, the BN management unit may determine whether or not a conflict between transactions included confirmation blocks different with each other is present, and perform operations for the same. Determining whether or not a conflict between transactions is present and operations for the same is to determine whether or not the same transaction is present within confirmation blocks different with each other, and when the same transaction is present so that double spending occurs, to discard the corresponding transaction. Herein, the BN management unit may discard the transaction on the basis of the order of the confirmation blocks. For example, for the same transaction is present within confirmation blocks different with each other, a policy of discarding a transaction of a confirmation block arranged relatively backwardly in the order may be used. Further, in S506, the BN management unit may generate a discard transaction list 332 including discarded transactions, and insert the list into the scalable header 330.

Meanwhile, in S507, the BN management unit may determine as a final block the confirmation block to which the scalable header is added by using an appropriate consensus protocol between management nodes. The block that is finally determined as the final block may become a formal block of the blockchain. For example, as a consensus protocol, a PBFT protocol, an RAFT protocol, etc. may be used.

In S508, the BN management unit may perform operations of distributing the final block. For example, when a management node itself is determined as a node generating a block through a consensus protocol, the BN management unit may add and connect a generated final block to the blockchain stored in its own local storage, and transmit the generated final block to other nodes.

Figure 5B:
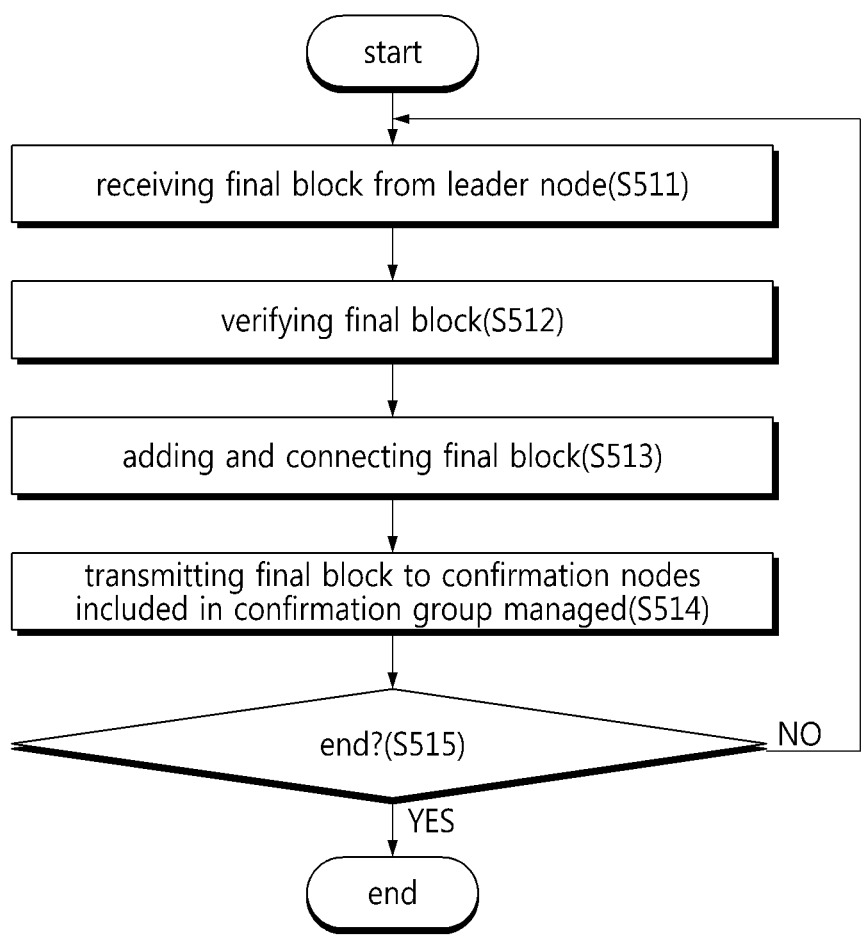

Meanwhile, FIG. 5B is a view of a flowchart showing detailed operations of the BN management unit shown in FIG. 3, and shows an operational order of the management node operating as the follower node.

First, in S511, the BN management unit of a follower management node receives a final block from the leader node, and in S512, an operation of verifying the final block is performed.

Subsequently, in S513, the BN management unit may add and connect the final block received in S511 to the blockchain stored in its own local storage, and in S514, the BN management unit may transmit the final block to confirmation nodes included in the confirmation group managed by the BN management unit.

Figure 6:
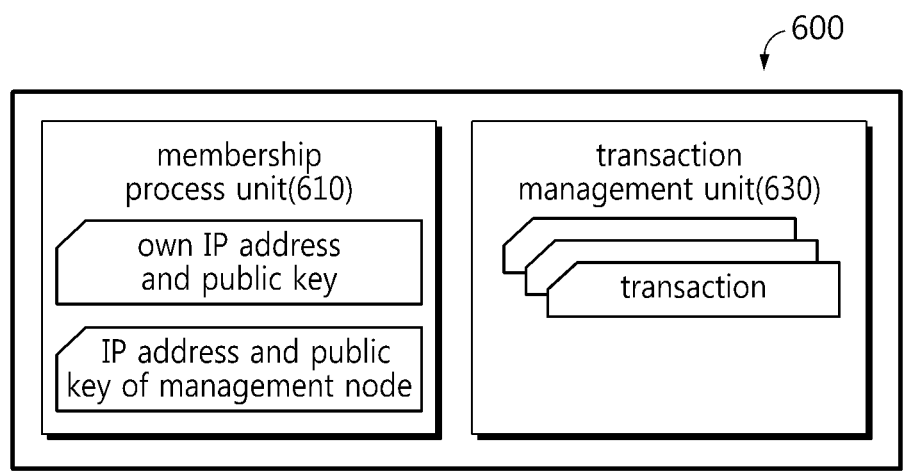
FIG. 6 is a block diagram of a configuration showing a confirmation node included in the blockchain system according to an embodiment of the present disclosure.

FIG. 6 is a block diagram of a configuration showing a confirmation node included in the blockchain system according to an embodiment of the present disclosure.

Referring to FIG. 6, a confirmation node 600 may include a membership process unit 610, and a transaction management unit 630.

The membership process unit 610 may operate in conjunction with the above-described confirmation group management unit 210 of the management node 200 so as to perfoim operations of approving participation of the confirmation node 600 in a confirmation group, resetting the confirmation group, performing merging on the confirmation node, performing transfer on the confirmation node, etc.

For the same, the membership process unit 610 may manage an IP address representing own IP address, a public key used for node verification, etc. In addition, a network address and a public key of a management node managing the confirmation group are required so that the confirmation node 600 participates in the corresponding confirmation group. Accordingly, the membership process unit 610 may prestore a network address and a public key of the management node managing the confirmation group, or may perform an operation of obtaining a network address and a public key of the management node managing the confirmation group through communication with another object.

Further, detailed operations of the membership process unit 610 that performs operations of approving participation in the confirmation group, resetting the confirmation group, performing merging on the confirmation node, performing transfer on the confirmation node etc. will be described with reference to FIGS. 7A to 7D below.

The transaction management unit 630 may store a transaction generated within the confirmation group to which the confirmation node 600 belongs. For example, the transaction management unit 630 may check a transaction generated by communication with a client, store the checked transaction, and transmit the transaction to another confirmation node. In addition, the transaction management unit 630 may receive a transaction from another confirmation node within the confirmation group or from the management node, and verify the received transaction and store the verified transaction.

Hereinafter, referring to FIGS. 7A to 7D, detailed operations of approving participation of the confirmation node in the confirmation group, resetting the confirmation group, performing merging on the confirmation node, performing transfer on the confirmation node, etc. by communication between the management node and the confirmation node will be described.

Operations of the blockchain system according to an embodiment of the present disclosure which are shown in FIGS. 7A to 7D may be performed on the basis of the confirmation group management unit 210 of the management node, and the membership process unit 610 of the confirmation node which are described above, but the present disclosure is not limited thereto. Various modifications can be made by those skilled in the art of the present disclosure. Accordingly, operations of the blockchain system according to an embodiment of the present disclosure which are shown in FIGS. 7A to 7D are described by assuming that the operations are performed by the management node and the confirmation node.

Figure 7A:
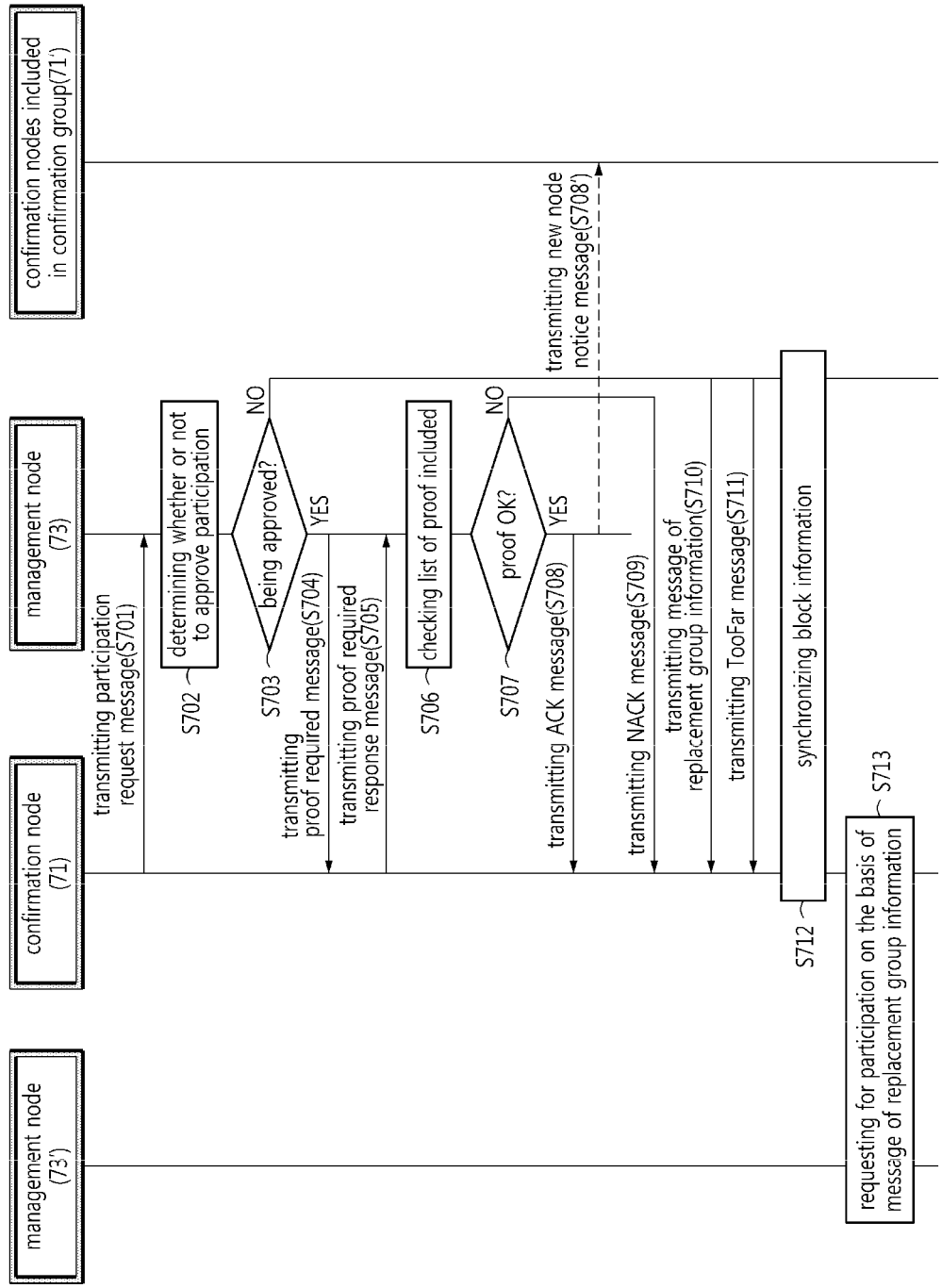
FIG. 7A is a view of a flowchart showing operations of the confirmation node of the blockchain system according to an embodiment of the present disclosure which participates in the confirmation group.

FIG. 7A is a view of a flowchart showing operations of participating in the confirmation group of the confirmation node of the blockchain system according to an embodiment of the present disclosure.

First, in S701, a confirmation node 71 that wants to participate in a confirmation group may check a network address (for example, IP address) of a management node 73 managing the corresponding confirmation group, and transmit a participation request message to the management node 73 by using the checked network address (for example, IP address) and a public key of the management node 73. In addition, the confirmation node 71 may configure the participation request message by including own network address (for example, IP address) and a public key.

Additionally, the confirmation node 71 may include a hash value of the last block among blocks of own blockchain in the participation request message.

In S702, the management node 73 having received the participation request message may check a node state of the confirmation group, and determine whether or not to approve the participation of the confirmation node 71. Whether or not to approve the participation of the confirmation node 71 may be determined according to a number of nodes constituting the confirmation group, the consensus time of the confirmation block, etc. For example, the management node 73 may check a number of confirmation nodes included in the confirmation group, and determine whether or not to approve the participation of the confirmation node 71 according to whether or not the checked number of confirmation nodes exceeds a predetermined threshold value. In another example, the management node 73 may check an average block consensus time of the confirmation group, and determine whether or not to approve the participation according to whether or not the average block consensus time exceeds a predetermined threshold value.

When the participation of the confirmation node 71 is approved (S703—YES), in S704, the management node 73 may transmit a proof required message to the confirmation node 71. Herein, the proof required message may include a public key of the management node, a seed value issued by the management node, a difficulty level indicating a level of difficulty of a hash function problem, and a count value representing a number of times to solve the hash function problem.

In S705, the confirmation node 71 may repeatedly perform calculation by using information included in the proof required message as below until a hash value of a hash function becomes smaller than a difficulty level value by changing a nonce value. The confirmation node 71 has to determine as many answers for the hash function problem as a number corresponding to a count value. In other words, answers of the hash function problem are determined as many as the number of count values. The proof required response message is configured by including the result, and provided to the management node 73.

Hash (a seed value issued by the management node || a public key of the confirmation node || nonce)

Herein, the proof required response message may include a public key of the confirmation node, a public key of the management node, a seed value issued by the management node, a difficulty level value, and a list of answers for the hash function problem. The answer for the hash function problem means a nonce value determined by the confirmation node, and a number of lists is identical to a count value. A list of nonce values is referred to as a list of proof. Further, the management node 73 may encrypt parameters included in the proof required message by using the public key of the confirmation node 71, and the confirmation node 71 may encrypt parameters included in the proof required response message by using the public key of the management node 73.

Further, the management node 73 may encrypt parameters included in the proof required message by using the public key of the confirmation node 71, and the confirmation node 71 may encrypt parameters included in the proof required response message by using the public key of the management node 73.

Subsequently, in S706, the management node 73 may check a list of proof included in the proof required response message, and transmit an ACK or NACK message to the confirmation node 71 by checking an error from the list of proof.

In other words, when an error is not present in the list of proof (S707—YES), in S708, the management node 73 may transmit an ACK message to the confirmation node 71.

Additionally, in S708', the management node 73 may transmit a new node notice message that represents the participation of the confirmation node 71 in the confirmation group to at least one existing confirmation node 71' of the confirmation group.

Meanwhile, when an error is present in the list of proof (S707-NO), in S709, the management node 73 may transmit a NACK message to the confirmation node 71. Herein, the management node 73 may generate a reason for refusal, and insert the reason for refusal into the NACK message. Examples of the reason for refusal inserted into the NACK message may be as Table 1 below.

TABLE 1

| Reason for refusal | Meaning |
| --- | --- |
| Difficulty level does not match | A difficulty level that is not matched with a difficulty level provided by management node is used |
| Invalid seed | A seed value provided by the management node is not used |
| Answer is incorrect | Error in a result of the has function problem |

The management node 73 may restrict a new node with low performance to join for the confirmation group so as to ensure performance of the confirmation group. For example, the management node 73 may check a difference between a time at which the roof required message is transmitted and a time at which the proof required response message is received, and restrict the confirmation node 71 to join the confirmation group when the checked time difference exceeds a predetermine threshold value. As describe above, when the checked time difference exceeds a predetermine threshold value, the management node 73 may insert a reason for refusal of "Too late" into an NACK message.

Meanwhile, when the participation of the confirmation node 71 is not approved (S703-NO), in S710, the management node 73 may configure a message of replacement group information, and provide the message to the confirmation node 71. Herein, the message of replacement group information may include at least one piece of information of the confirmation group, for example, an address value of the management node 73' of the confirmation group, a public key of the management node 73', etc. Based on the above, in S713, the confirmation node 71 may perform access to the management node 73' of the replacement group on the basis of the information included in the message of replacement group information, and participate in the replacement group. A participation request for the management node 73' of the replacement group may be performed on the basis of the above-described S701 to S710.

Additionally, in S711, the management node 73 may check the hash value of the last block included in the participation request message, and determine a distance between a block belonging to the management node 73 and the last block included in the participation request message. In addition, when the determined distance between the blocks exceeds a predetermined threshold value, the management node 73 may determine that the corresponding confirmation node 71 does not possess a recent block, and transmit a message (for example, TooFar message) for notifying the same to the confirmation node 71. Herein, a TooFar message may include information representing a distance between the block belonging to the management node 73 and the last block included in the participation request message.

Subsequently, in S712, the confirmation node 71 having received the TooFar message may synchronize block information with the management node 73 by receiving information on a recent block from arbitrary node. For example, nodes storing block information (confirmation nodes 71 and 71' and management nodes 73 and 73') may provide block information stored therein by using an API to other nodes. For example, as an API, getNextBlock (string currentBlockId), getNextBlocks (string currentBlockId), etc. may be used. Herein, getNextBlock (string currentBlockId) may be an API configured to provide a block subsequent to a block identified as currentBlockId, and getNextBlocks (string currentBlockId) may be an API configured to provide all blocks identified as currentBlockId.

Based on the above, the confirmation node 71 having received the TooFar message may receive block information from another node through call of the above-described API, for example, getNextBlock(string currentBlockId), getNextBlocks(string currentBlockId), etc., and synchronize block information with another node.

Figure 7B:
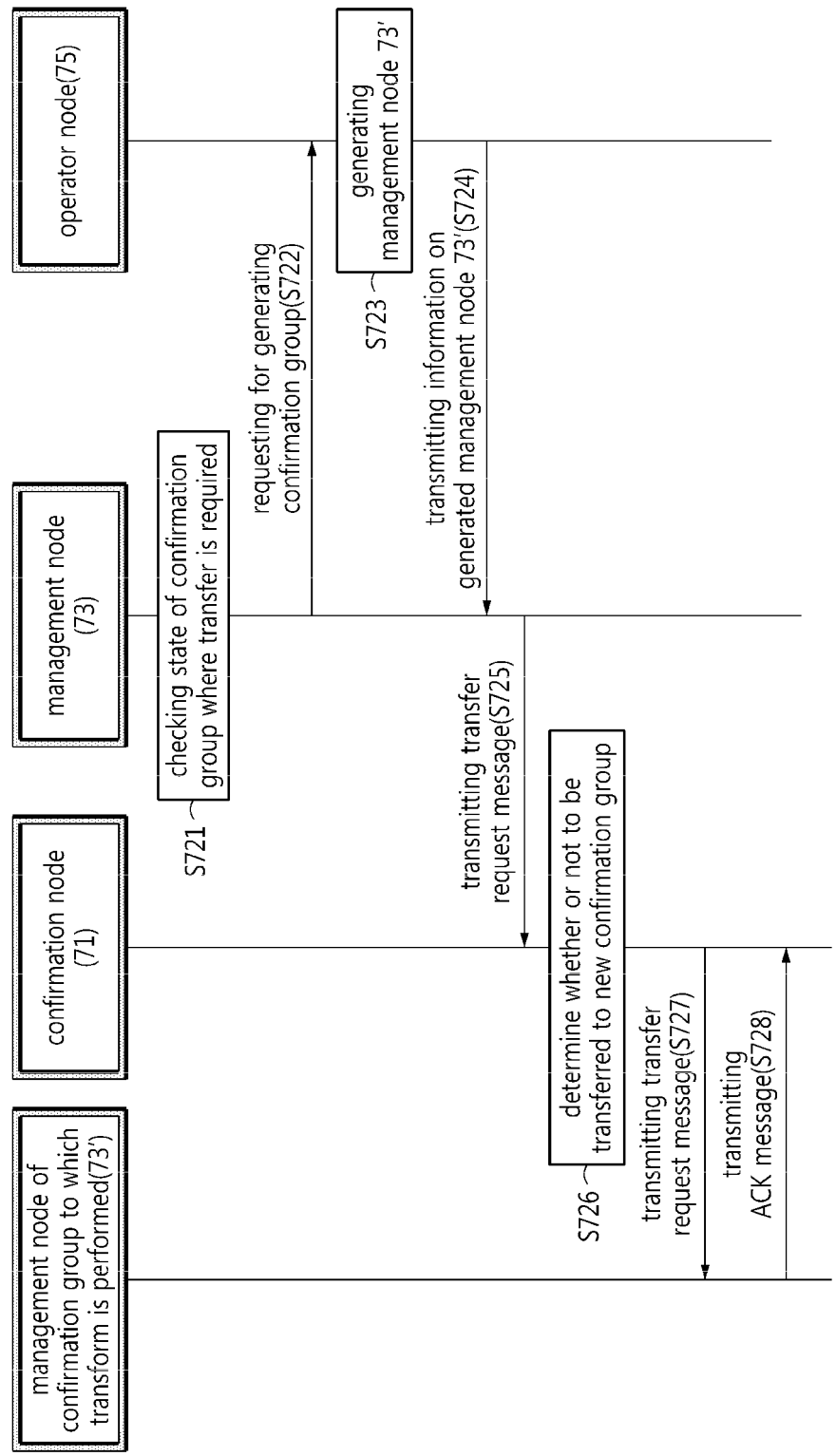
FIG. 7B is a view of a flowchart showing operations of resetting a confirmation group of the blockchain system according to an embodiment of the present disclosure.

FIG. 7B is a view of a flowchart showing operations of resetting a confirmation group of the blockchain system according to an embodiment of the present disclosure.

First, in S721, the management node 73 may check a state of the confirmation group where resetting is required. For example, a state of the confirmation group where resetting is required may be a state where a processing speed of the confirmation group exceeds a predetermined threshold value, a state where performing transfer of another confirmation group is not available, etc.

In S722, the management node 73 may request an operator node 75 to generate a confirmation group. In association thereto, in S723 and S724, the operator node 75 may generate a management node 73', and transmit information on the generated management node 73' to the management node 73 present within the blockchain system.

In S725, the management node 73 may transmit a transfer request message to at least one confirmation node 71 included within the confirmation group. Herein, the transfer request message may include address information (for example, IP address) and a public key of the confirmation node on which the transfer is performed, and address information (for example, IP address) and a public key of the management node 73' of the confirmation group to which the transfer is performed.

In S726, the confirmation node 71 having received the transfer request message may determine whether to be transferred to a new confirmation group, or to remain in the existing confirmation group.

When transfer to a new confirmation group is performed, in S726, the confirmation node 71 transmits the transfer request message to a management node 73' of the new confirmation group.

In S727, the management node 73' transmits an ACK message to the confirmation node 71, and completes the transfer of the confirmation node 71.

Figure 7C:
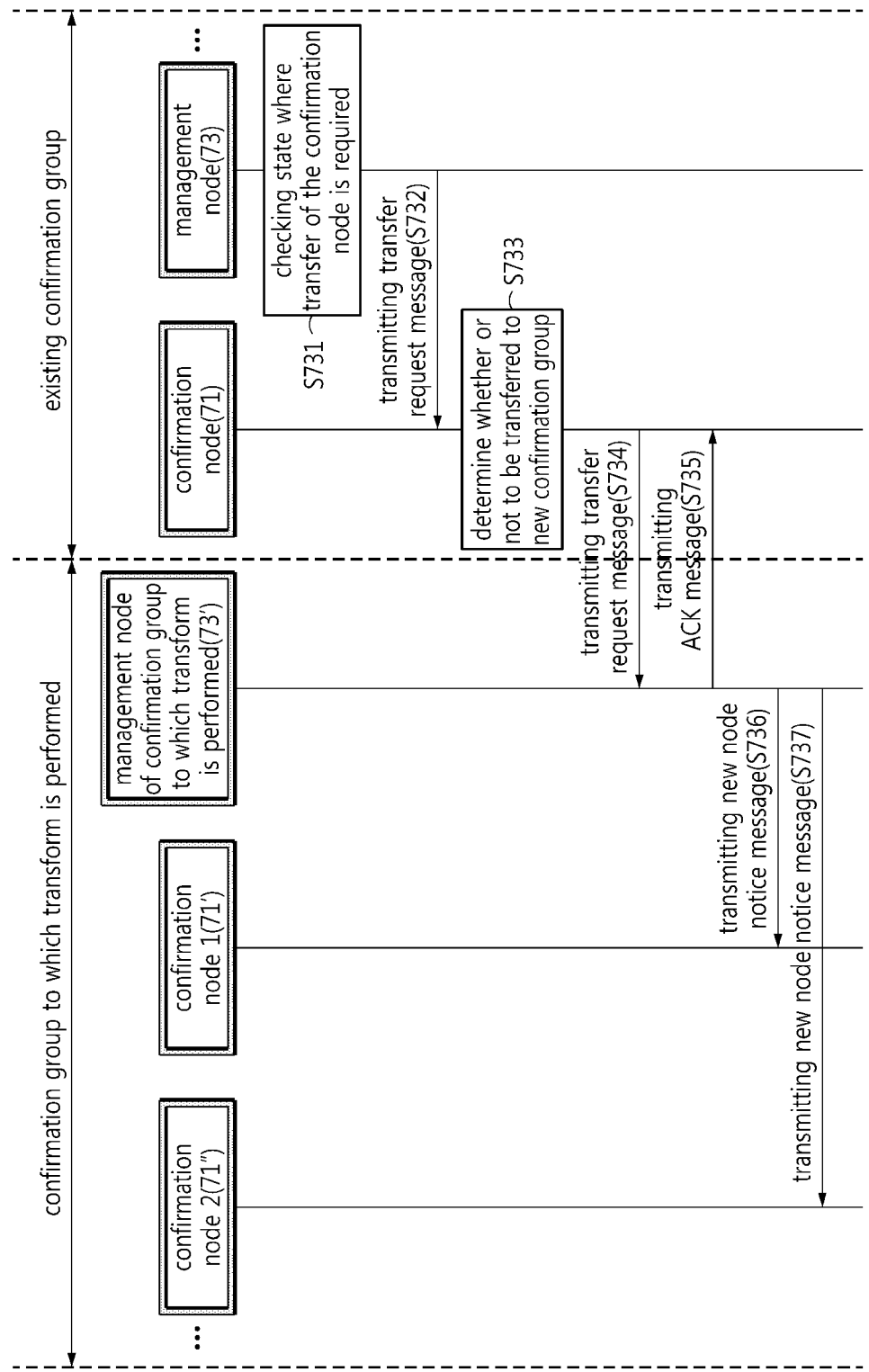
FIG. 7C is a view of a flowchart showing operations of performing transfer on a confirmation node of the blockchain system according to an embodiment of the present disclosure.

FIG. 7C is a view of a flowchart showing operations of performing transfer of the confirmation node of the blockchain system according to an embodiment of the present disclosure.

First, in S731, the management node 73 may check a state where transfer of the confirmation node is required. For example, a state where transfer of the confirmation node is required may be a state where a processing speed of the confirmation group exceeds a predetermined threshold value, etc.

In S732, the management node 73 may transmit a transfer request message to at least one confirmation node 71 included in the confirmation group. Herein, the transfer request message may include address information (for example, IP address) and a public key of the confirmation node on which the transfer is performed, and address information (for example, IP address) and a public key of the management node 73' of the confirmation group to which the transfer is performed.

In S733, the confirmation node 71 having received the transfer request message may determine whether to be transferred to a new confirmation group, or to remain in the existing confirmation group.

When a transfer to another confirmation group is performed, in S734, the confirmation node 71 transmits the transfer request message to the management node 73' of another confirmation group.

In S735, the management node 73' transmits an ACK message to the confirmation node 71, and completes the transfer of the confirmation node 71.

Additionally, in S736 and S737, the management node 73' may transmit a new node notice message that represents the participation of the confirmation node 71 in the confirmation group to at least one of existing confirmation nodes 71' and 71".

FIG. 7D is a view of a flowchart showing operations of performing merging on the confirmation node of the blockchain system according to an embodiment of the present disclosure.

First, in S741 the, the management node 73 may check a state of the confirmation node where merging is required. For example, a state of the confirmation node where merging is required confirmation node may be a state where a processing speed of a plurality of confirmation groups is smaller than a predetermined threshold value, a state where a number of confirmation nodes included in the confirmation group is smaller than a predetermined threshold value, etc.

In S742, the management node 73 may transmits a merge request message to the confirmation node 71 of the confirmation group where merging is required. Herein, the merge request message may include address information (for example, IP address) and a public key of the confirmation node on which the merging is performed, and address information (for example, IP address) and a public key of the management node of the confirmation group into which the merging is performed.

In S743, the confirmation node 71 having received the merge request message may determine whether to be merged into another confirmation group, or to remain in the existing confirmation group.

When merging into another confirmation group is performed, in S744, the confirmation node 71 transmits the merge request message to the management node 73" of another confirmation group.

In S745, the management node 73" transmits an ACK message to the confirmation node 71, and completes the merging of the confirmation node 71. In addition, in S746 and S747, the management node 73" transmits a new node notice message that represents the participation of the confirmation node 71 in the confirmation group to at least one of existing confirmation nodes 71' and 71".

Additionally, in S748, the management node 73" may notify the operator node 75 that the merging of the confirmation group has completed. In association thereto, in S749 and S750, the operator node 75 may remove the management node 73 from the blockchain system, and notify another management node 77 within the blockchain system of the removal of the management node 73.

Figure 8:
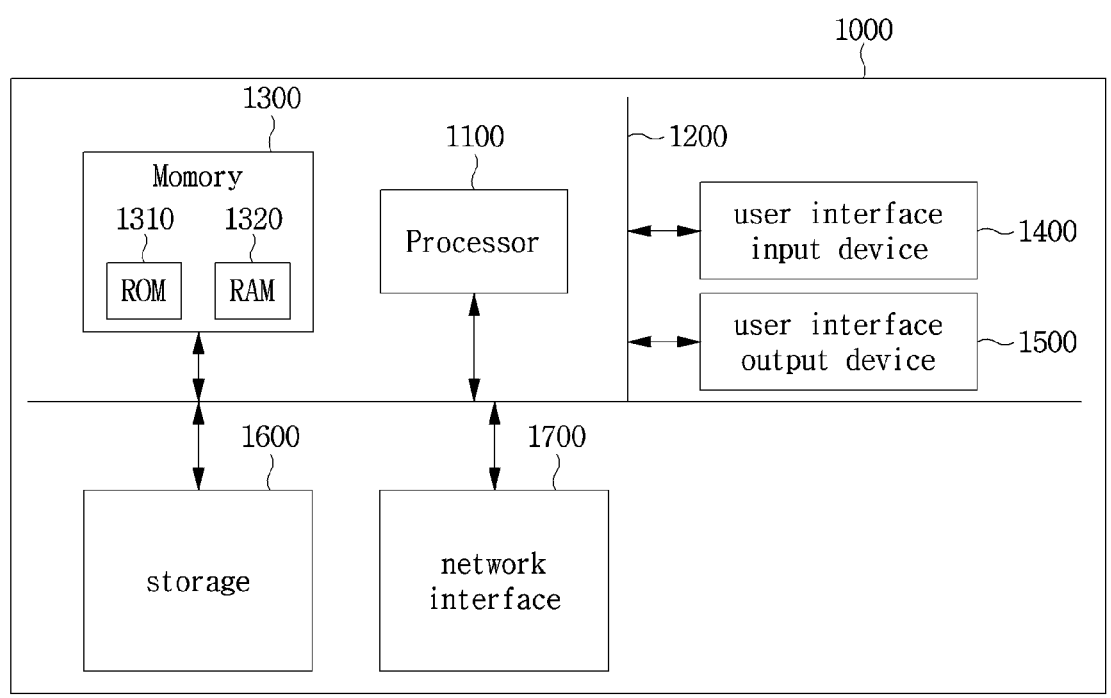
FIG. 8 is a block diagram showing a computing system executing the according to an embodiment of the present disclosure, and the operation method thereof.

FIG. 8 is a block diagram showing a computing system executing the according to an embodiment of the present disclosure, and the operation method thereof.

Referring to FIG. 8, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A management node in a blockchain system, the management node controlled by an operator node connected to the blockchain system, the management node comprising:
   a processor and a non-transitory computer-readable storage medium storing instructions executable by the processor to cause the management node to perform operations comprising:
      configuring a confirmation group by including at least one confirmation node connected to the blockchain system, and configuring a confirmation block by combining transactions generated in the confirmation group; and
      configuring a blockchain by combining respective confirmation blocks, wherein the management node configures the blockchain by resetting a parent block on the basis of a generation order of the confirmation blocks and distributes the blockchain;
      wherein the confirmation block includes:
      a block body including a list of the transactions; and
      a block header including at least one of a hash value of the parent block, a root value of a Merkle tree for a transaction included in the confirmation block, a time at which the confirmation block is generated, and an identifier of the confirmation group in association with the confirmation block.

2. The management node of claim 1, wherein the management node checks whether or not a conflict between transactions respectively included in confirmation blocks different from each other is present, and configures the confirmation block by reflecting whether or not the conflict between transactions is present.

3. The management node of claim 1, wherein the management node resets the parent block according to a parent block set in the confirmation block, and the time at which the confirmation block is generated.

4. The management node of claim 3, wherein the management node configures a scalable header including a hash value of the reset parent block, and a hash value of the block header included in the confirmation block, and configures a final block by adding the configured scalable header to the confirmation block.

5. The management node of claim 4, wherein the management node determines to discard a transaction according to whether or not a conflict between transactions respectively included in confirmation blocks different with each other is present.

6. The management node of claim 5, wherein the management node inserts a discarded transaction list indicating the discarded transaction into the scalable header.

7. The management node of claim 1, wherein the management node includes a first management node included in a first confirmation group that monitors a state of the blockchain system, and transmits a request message for performing transfer from the first confirmation group to a second confirmation group to a first confirmation node of the first confirmation group, wherein the transfer request message includes an address and a public key of the first confirmation node, and an address and a public key of a second management node included in the second confirmation group, and a signature value of the first management node.

8. The management node of claim 7, wherein the first confirmation node determines whether or not to be transferred to the second confirmation group, and transmits the transfer request message to the second management node.

9. The management node of claim 7, wherein the first confirmation node generates the second management node according to a state of the blockchain system.

10. A management node in a blockchain system, the management node controlled by an operator node connected to the blockchain system, the management node comprising:
   a processor and a non-transitory computer-readable storage medium storing instructions executable by the processor to cause the management node to perform operations comprising:
      configuring a confirmation group by including at least one confirmation node connected to the blockchain system, and configuring a confirmation block by combining transactions generated in the confirmation group; and
      configuring a blockchain by combining respective confirmation blocks, wherein the management node configures the blockchain by resetting a parent block on the basis of a generation order of the confirmation blocks and distributes the blockchain;
      wherein the management node includes a first management node included in a first confirmation group that receives a participation request message in the confirmation group from a first confirmation node, determines a result indicating whether or not to approve the participation of the first confirmation node in the first confirmation group, and notifies the first confirmation node of the determined result.

11. The management node of claim 10, wherein the first management node determines whether or not to approve the participation of the first confirmation node in the first confirmation group according to at least one of a number of nodes constituting the first confirmation group, and a consensus time of the confirmation block.

12. The management node of claim 10, wherein the first management node transmits a new node notice message representing the participation of the first confirmation node in the first confirmation group to the at least one confirmation node included in the first confirmation group.

13. The management node of claim 10, wherein the first management node determines at least one second confirmation group different from the first confirmation group, and provides information indicating at least one second management node included in the at least one second confirmation group to the first confirmation node.

14. The management node of claim 10, wherein the participation request message includes a hash value of a last block among blocks included in the first confirmation node.

15. The management node of claim 14, wherein the first management node determines whether or not to approve the participation of the first confirmation node in the first confirmation group on the basis of a distance between the last block included in the first confirmation node and a last confirmation block included in a unit of a management group.

16. The management node of claim 10, wherein the first management node transmits a proof required message including at least one of a nonce value issued by the first management node, information representing a level of difficulty of a hash function, and information on a count value representing a number of times of performing the hash function to the first confirmation node, receives a proof required response message including a result value of the hash function from the first confirmation node, and determines whether or not to approve the participation of the first confirmation node in the first confirmation group according to the result value of the hash function.

17. The management node of claim 16, wherein the first management node transmits a NACK message indicating a refusal of the participation in the first confirmation group to the first confirmation node, wherein the NACK message includes a reason for refusal.

18. The management node of claim 17, wherein the reason for refusal includes at least one of information indicating that a node in association with an address and a public key of the first node has been already joined, information representing that the information of the level of difficulty does not match, information indicating that the nonce value provided from the first management node is not used, and information indicating that an error exists in a result value of the hash function.

19. A method of operating a blockchain system, the method comprising:
respectively configuring, by at least one management node controlled by an operator node, at least one confirmation group including the management node and at least one confirmation node;
configuring, by the least one management node, a confirmation block by combining transactions generated in the confirmation group; and
configuring, by the least one management node, a blockchain by combining the confirmation blocks configured in another management node,
wherein the blockchain is configured by resetting a parent block according to a generation order of the confirmation blocks so as to be distributed; and
wherein the at least one management node includes a first management node included in a first confirmation group that receives a participation request message in the confirmation group from a first confirmation node, determines a result indicating whether or not to approve participation of the first confirmation node in the first confirmation group, and notifies the first confirmation node of the determined result.

* * * * *